(12) United States Patent
Levin et al.

(10) Patent No.: US 8,136,333 B1
(45) Date of Patent: Mar. 20, 2012

(54) LAWNMOWER CUTTING DECK AND RELEASABLE BLADE

(75) Inventors: Shalom Levin, Atlit (IL); Shai Abramson, Pardesia (IL)

(73) Assignee: F Robotics Acquisitions Ltd., Pardesiya (IL)

( * ) Notice: Subject to any disclaimer, the term of this patent is extended or adjusted under 35 U.S.C. 154(b) by 1112 days.

(21) Appl. No.: 09/531,735

(22) Filed: Mar. 21, 2000

(51) Int. Cl.
*A01D 34/00* (2006.01)

(52) U.S. Cl. .......................................... 56/16.7; 30/276

(58) Field of Classification Search .................. 56/10.2, 56/6, 7, 16.7, 16.8, DIG. 2, DIG. 3, DIG. 15, 56/12.7, 12.5; 172/41, 123; 30/276
See application file for complete search history.

(56) References Cited

U.S. PATENT DOCUMENTS

| | | | | |
|---|---|---|---|---|
| 3,212,244 A | * | 10/1965 | Wilgus | 56/17.1 |
| 3,500,620 A | * | 3/1970 | Duran et al. | 56/12.8 |
| 3,670,413 A | | 6/1972 | Weber | |
| 3,973,378 A | * | 8/1976 | Bartasevich et al. | 56/11.9 |
| 4,031,696 A | * | 6/1977 | Fleigle | 56/295 |
| 4,064,680 A | * | 12/1977 | Fleigle | 56/11.9 |
| 4,067,108 A | * | 1/1978 | Ballas | 30/276 |
| 4,089,114 A | | 5/1978 | Doolittle et al. | |
| 4,124,938 A | * | 11/1978 | Ballas, Sr. | 30/276 |
| 4,232,505 A | * | 11/1980 | Walto | 56/12.7 |
| 4,308,713 A | * | 1/1982 | James | 56/11.9 |
| 4,335,567 A | * | 6/1982 | Comer | 56/12.7 |
| 4,696,153 A | * | 9/1987 | Boains, Jr. | 56/295 |
| 4,882,896 A | * | 11/1989 | Wilcox | 56/10.5 |
| 4,944,142 A | * | 7/1990 | Sueshige et al. | 56/320.1 |
| 5,007,234 A | * | 4/1991 | Shurman et al. | 56/10.2 |
| 5,163,273 A | | 11/1992 | Wojtkowski et al. | 56/11.9 |
| 5,404,697 A | * | 4/1995 | Dewey | 56/12.7 |
| 5,572,856 A | * | 11/1996 | Ku | 56/10.2 A |
| 5,638,668 A | * | 6/1997 | Kallevig et al. | 56/320.1 |
| 5,881,465 A | * | 3/1999 | Brant et al. | 30/276 |
| 5,894,715 A | * | 4/1999 | Braun et al. | 56/11.9 |
| 6,164,049 A | * | 12/2000 | Burch | 56/16.8 |
| 6,247,539 B1 | * | 6/2001 | Jerez | 172/41 |
| 6,321,515 B1 | * | 11/2001 | Colens | 56/10.2 |

FOREIGN PATENT DOCUMENTS

| | | | |
|---|---|---|---|
| DE | 3618177 | * | 12/1987 |
| WO | WO 98/41081 | | 9/1998 |
| WO | WO 99/59042 | | 11/1999 |
| WO | WO 99/65289 | | 12/1999 |

OTHER PUBLICATIONS

"Robomow—Installation and Operation Guide" © 1999—16 Pages.
"Robomow—The World's First Moving Robot"—8 Pages.
"Robomow—Enjoy Your Free Time"—4 Pages.
"Robomow—User Guide"—15 Pages, 1999.

* cited by examiner

*Primary Examiner* — Arpad Fabian-Kovacs
(74) *Attorney, Agent, or Firm* — Gregory J. Elman; Elman Technology Law, P.C.

(57) ABSTRACT

A cutting system for a lawnmower or the like includes multiple blade assemblies driven by a motor, each motor independently operable with respect to each other motor. The blade assemblies are arranged into a cutting system with a length less than that of the combined length of the blades of the blade assemblies. Blade assemblies include components that align so as to balance the blade upon rotation. These components allow for a single user to attach and disengage the blade from the motor, or portion rotated thereby, with hands alone, absent tools.

17 Claims, 8 Drawing Sheets

LAWNMOWER CUTTING DECK AND RELEASABLE BLADE

CROSS REFERENCES TO RELATED APPLICATIONS

This patent application is related to commonly owned U.S. Design patent application entitled: ROBOTIC LAWNMOWER, filed on even date herewith, and commonly owned U.S. Utility patent application entitled: TACTILE SENSOR, also filed on even date herewith, both of these patent applications are incorporated by reference herein.

FIELD OF THE INVENTION

The present invention is related to mowing devices for mowing lawns and other vegetation areas, and more particularly to the cutting decks and the cutting blade assembly arrangements therein, as well the cutting blade assemblies therein.

BACKGROUND OF THE INVENTION

When mowing a lawn or other vegetation area, it is desired to cut the greatest width possible, as well as with the sharpest, or most robust cut. Conventional push or driven mowers, as well as the ROBOMOW® Classic™ autonomous lawnmower, available from Friendly Machines, Even Yehuda 40500, Israel, and detailed in "Robomow Installation & Operation Guide", ©1999, this document incorporated by reference herein, typically employ bodies with cylindrical or rounded blade hoods, that envelope a single rotating blade therein. The ROBOMOW® Classic™ autonomous lawnmower has a blade housing and blade assembly in accordance with that detailed in PCT patent application No. PCT/IL99/00336 (WO 99/65289), entitled: CUTTING AND MULCHING BLADE AND DEVICE, this PCT patent application incorporated by reference herein.

All of these mowers have a body with an area, preferably circular, for accommodating a single rotating blade. These blades typically include an opening though which a rod from the rotating motor extends. This rod is adapted to receive a bolt or the like at its end, to retain the blade in the assembled position for mowing (cutting). The blade length is less than the diameter than the blade hood for proper operation of the lawn mower.

This single blade construction exhibits drawbacks. Initially, the length of this single blade requires an equal cutting length (as well as an equal cutting width), whereby the length of the mower is fixed at least by the length of this single cutting blade. Also, this single blade is rotated by the motor at a single speed, and should there be high grass, dense grass, dense vegetation or combinations thereof, the blade rotation will slow down and cutting speed will be slower, resulting in a less sharp or robust cut.

Moreover, in multiple blade mowers, these blades are typically connected by a single belt and driven by a single motor. If a high resistance is applied to one of the blades, such as in dense grass or vegetation, this one blade slowing down affects all other blades and forces them to slow down as well. Again, the blade rotations will slow down and cutting speeds will be slower, resulting in a less sharp or robust cut.

All of the lawnmowers mentioned above exhibit additional drawbacks in that their blades are attached to a rotating rod by a bolt or other similar screw-type mechanism. This is because disassembly and reassembly of the blade onto the rotating rod requires special tools, is time consuming and may be dangerous. Moreover, when the blade is reassembled onto the rod, it may not be assembled so as to be balanced, due to wear on the opening and improper positioning by the person doing the reassembly. Also, the blades may be attached too loose or too tight, whereby the blade could come off, if too loosely attached, or could fail if too tightly attached.

SUMMARY OF THE INVENTION

The present invention improves on the contemporary art by providing a cutting system of multiple blade assemblies positioned in the mower body on a cutting deck, so as to shorten the length of the mower, when compared to a single blade having the length that is the sum of the lengths of multiple blades. Also, the cutting system is such that each blade assembly is powered (rotated) by its own dedicated motor, with each motor independently operable with respect to each other motor, and thus, each motor is capable of being controlled independently of the other motors, so as to rotate the respective blades at different speeds, to produce a sharp, robust cut. This arrangement of motors is such that, on average, input power for operating all motors is less than the input power for suitable motors that power single blades for covering the same cutting widths. Additionally, there is disclosed a blade assembly, whereby the blade attached to the rotating mechanism in a simple, safe and tool free manner, whereby the attachment results in the blade being balanced and with the proper amount of "play", so as not to be attached too loose or too tight.

One embodiment of the present invention is directed to a lawnmower with a cutting deck that accommodates a plurality of, typically three, blade assemblies. Each of these blade assemblies typically comprises a blade and a motor for rotating the blade. Each motor in each respective blade assembly is independently operable, and thus, typically independently controllable, with respect to each other motor in the respective other blade assemblies. The blade assemblies are typically spaced apart with respect to each other to define a cutting width, and this spacing is such that the cut produced by the lawnmower is a continuously cut segment, this segment having a length corresponding to, and typically the same as, the cutting width.

There is also disclosed an embodiment of the present invention directed to a lawnmower blade assembly. This blade assembly is balanced so as to provide proper blade rotation for sharp, clean cutting. This blade assembly includes a motor in communication with, typically terminating in a rotatable stub, and a blade including a cutting blade portion coupled to a receiver. This receiver includes members for receiving the stub and retaining it in the receiver in a releasable engagement. The motor, stub, cutting blade portion and receiver are configured to be in coaxial alignment, such that said the blade is balanced upon cutting. The stub and receiver are configured such that the stub includes an outer surface and the receiver includes an inner surface, that are correspondingly configured with respect to each other for allowing a sufficient but minimal amount of rotational play for the blade.

There is also disclosed another embodiment of a lawnmower blade assembly, that can be assembled and disassembled, typically the blade separated from the motor, in a "tools free" manner, by an operator using only his hands. The blade assembly has a motor in communication with, typically terminating, in a rotatable stub, and a blade including a cutting blade portion coupled to a receiver. This receiver includes a receiver member and flexible members in communication with the receiver member. The flexible members are designed for moving between outward and inward positions for engaging and retaining the stub in the receiver member in a releasable engagement, these flexible members including ends and configured such that pressure on these ends moves the flexible members outward, allowing for at least for the disengagement of the blade from the motor.

BRIEF DESCRIPTION OF THE DRAWINGS

Attention is now directed to the attached drawings, wherein like reference numeral or characters indicate corresponding or like components. In the drawings.

DETAILED DESCRIPTION OF THE DRAWINGS

Figure 1:
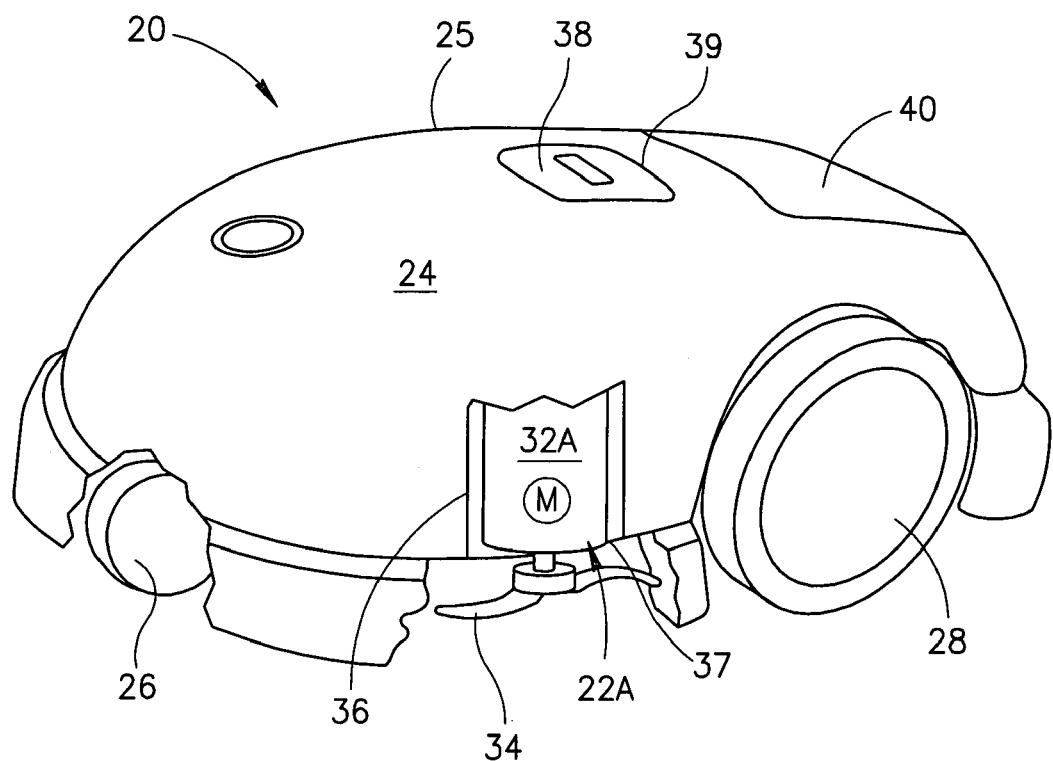
FIG. 1 is a perspective view of the present invention with a cut away section detailing blade assembly arrangement.
Figure 2:
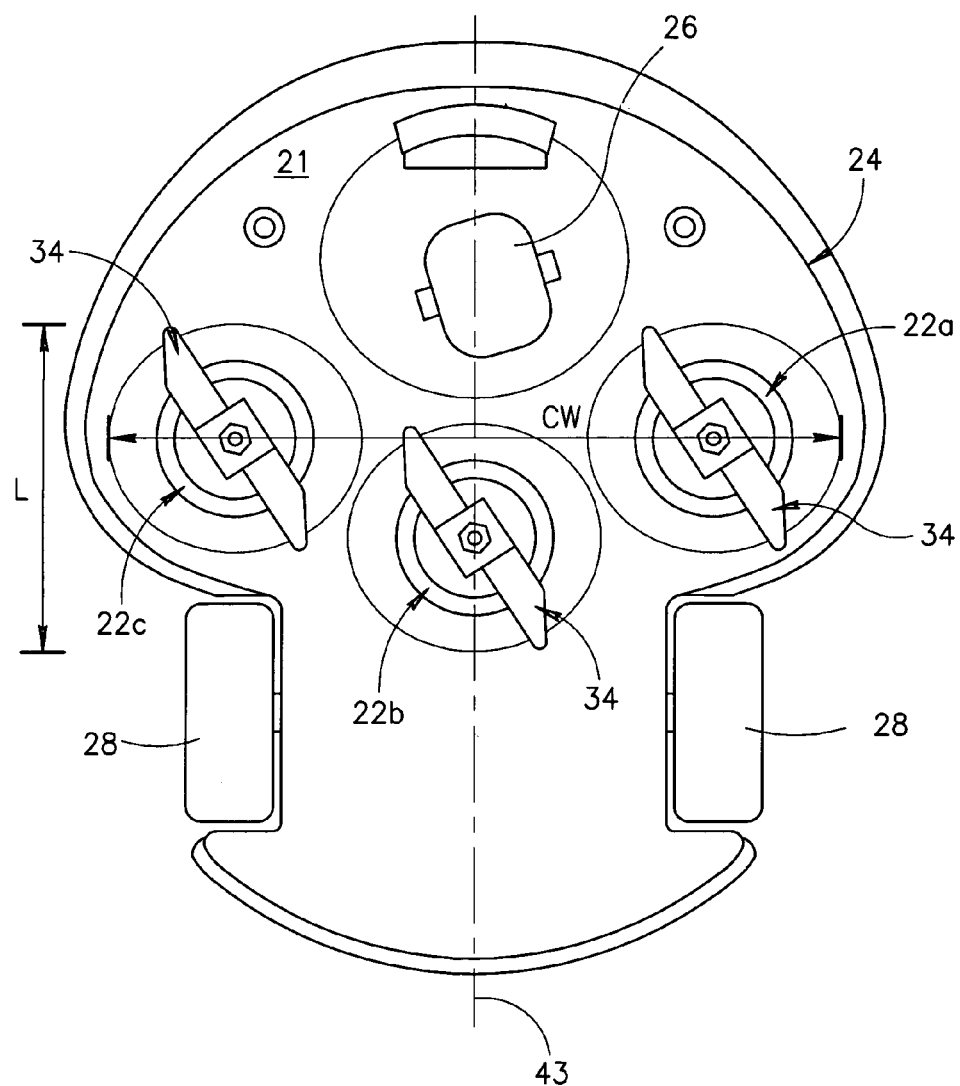
FIG. 2 is a bottom view of the present invention with a first embodiment of a blade assembly.

FIGS. 1 and 2 detail a lawnmower, here for example, a robotic lawnmower or robot 20, employing the cutting deck 21 and blade assemblies 22a-22c and blade assembly arrangement of the present invention. The robot 20 has a body 24 with an outer shell 25, along with front 26 and rear 28 wheels. The cutting deck 21, can be for example, a mulching deck, and fits into the body 24 so as to accommodate the blade assemblies 22a-22c, each having a dedicated motor (M) 32a-32c (motors 32b and 32c shown in FIG. 3) and blades 34, in an arrangement that defines the cutting system of the present invention. The body 24 includes chambers 36, closed by a ring-like plate 37, that attaches to the body 24 a snap-in fit or conventional mechanical fastening techniques, for accommodating and holding the respective motor (M) 32a-32c of the respective blade assembly 22a-22c. The body 24 and outer shell 25 also include a slot 38 for a controller 39, both remote and manual, as detailed in commonly owned U.S. patent application Ser. No. 09/221,834, entitled: METHOD FOR OPERATING A ROBOT, incorporated by reference herein, and the "Robomow Installation & Operation Guide", and a space 40 for a power supply 41 (FIG. 3) such as batteries (for example two standard 12V batteries).

Turning to the cutting deck 21, here for example, a mulching deck, as detailed in FIG. 2, the blade assemblies 22a-22c, particularly the blades 34 are positioned with lateral blade assemblies 22a and 22c positioned forward of an intermediate blade assembly 22b, and preferably in an arrangement corresponding to an isosceles triangle, with the base being a line at least substantially perpendicular to a longitudinal axis 43, extending through the body 24. The lateral blade assemblies 22a, 22c are at identical positions on opposite sides of the mulching deck 21 with the intermediate blade assembly 22b symmetric to each lateral blade assembly 22a, 22c.

This positioning of the blade assemblies 22a-22c on the cutting deck 21 allows for the blades 34 to be minimally spaced apart from each other at their edges, yet provide cutting over the entire cutting width (CW) defined by the total span of the blades 34. This positioning of blade assemblies 22a-22c provides a cut of the grass and/or vegetation that is a sharp, clean, and of a cut that is continuous over a segment of the grass and/or vegetation defined by the cutting width (CW) of the cutting deck 21. Additionally, this blade assembly arrangement is of length L (along axis 43), that is less than the sum of the lengths of all of the blades 34, and thus, the overall length of the body 24 is less than a comparable body of the conventional single blade construction, housing a blade equal in length to the sum of the three blades 34 of the blade assemblies 22a-22c.

The opposite configuration of lateral 22a, 22c blade assemblies with respect to the intermediate blade assembly 22b is also permissible. If necessary, the front wheel 26 can be moved rearward to accommodate this positioning. Additionally, any number of blade assemblies is also permissible provided the arrangement is in accordance with that detailed above.

The motors 32a-32c can be, for example, a 150 W input motor suitable for creating rotary motion. These motors 32a-32c are independently operable with respect to each other, and preferably controlled separately from each other (independently with respect to each other). As a result of this configuration, the respective blades 34 can rotate at different speeds with respect to each other, any two blades can rotate at the same speed with the third blade rotating at a different speed, or all three blades can rotate at the same speed.

Figure 3:
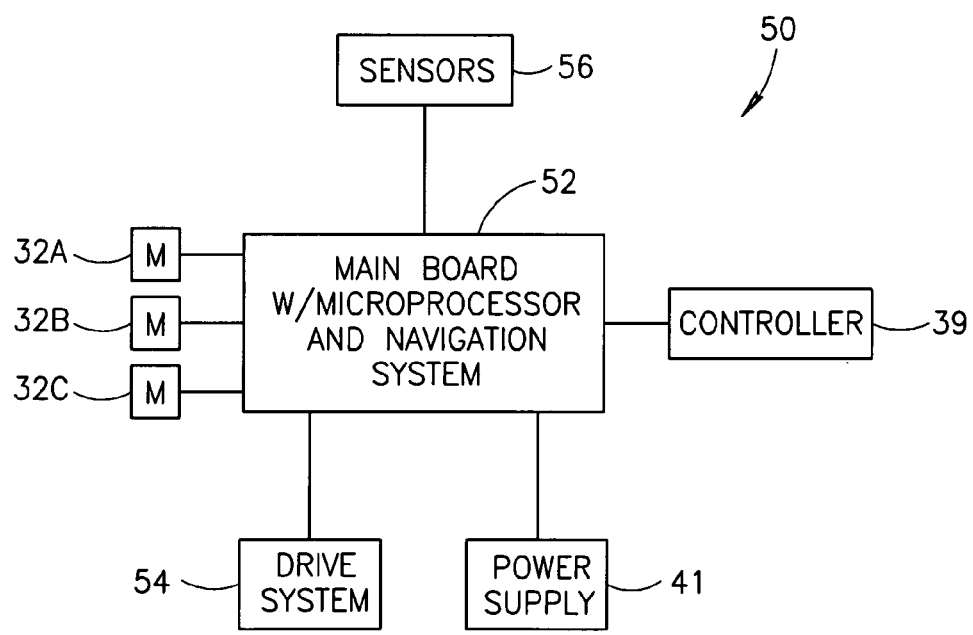
FIG. 3 is a schematic diagram of the operating system of the present invention.

FIG. 3 details the operating system 50 for the robot 20 housed in the body 24. While main components of the system are detailed here, all other components are identical or similar to those detailed in the ROBOMOW® Classic™ autonomous lawnmower, commonly owned PCT patent application No. PCT/IL99/00248 (WO 99/59042) entitled: AREA COVERAGE WITH AN AUTONOMOUS ROBOT, this PCT patent application incorporated by reference herein.

The operating system includes a main board 52 with a microprocessor, for the main control system. The main board 52 also includes components for providing a mapping and navigation system, such as that detailed in PCT/IL99/00248 (WO 99/59042). The main board 52 provides logic for the drive system circuitry 54 that controls movement of the wheels 26, 28, sensors 56, for example, those for detecting obstacles and boundaries, as detailed in PCT/IL99/00248, and the motors 32a-32c, for each of the blade assemblies 22aa-22c. The main board 52 is also coupled to each of the motors 36a-36c, as well as the controller 39. All components of this operating system are powered by the power supply 41.

The motors 32a-32c, as detailed above, are coupled to the main board 52, such that they can rotate the blades independently of each other, as detailed above. The motors 32a-32c can be controlled by commands from the controller 39, microprocessor of the main board 52, or both.

The controller 39, as detailed above, is configured for receiving commands from an operator, either manually or remotely, and sending these commands to the main board. These commands typically include ON (GO)/OFF (STOP) for the power supply 41, typically to completely stop robot motion as well as cutting. These commands typically are also directed to directional or motion commands for the drive system circuitry 54, to control the wheels 26, 28, as well as the cutting system (motors 32a-32c), and for individual control over the speed of each motor 32a-32c, such that blades 34 in their respective blade assemblies 22a-22c, rotate at different speeds, resulting in a sharp, robust and continuous cut along the cutting width (CW).

The motors 32a-32c typically include feedbacks to the microprocessor, to signal the microprocessor for control thereby. For example, should one blade 34 contact dense grass or vegetation, the other independently operating and controlled blades 34 can rotate at different speeds, unaffected by the change in speed of the blade in the dense grass or vegetation. Moreover, the microprocessor can detect the rotational speed decrease, and increase the rotational speed of the motor, to better cut this dense grass or vegetation. Also, the speed can be decreased, or the motor shut down temporarily or completely, if the speed decrease is such that further rotation of the blade will damage the motor, such as if rocks or other hard protruding objects are contacted. The above operational scheme is permissible for any two of the three blades or all three of the blades.

Figure 4:
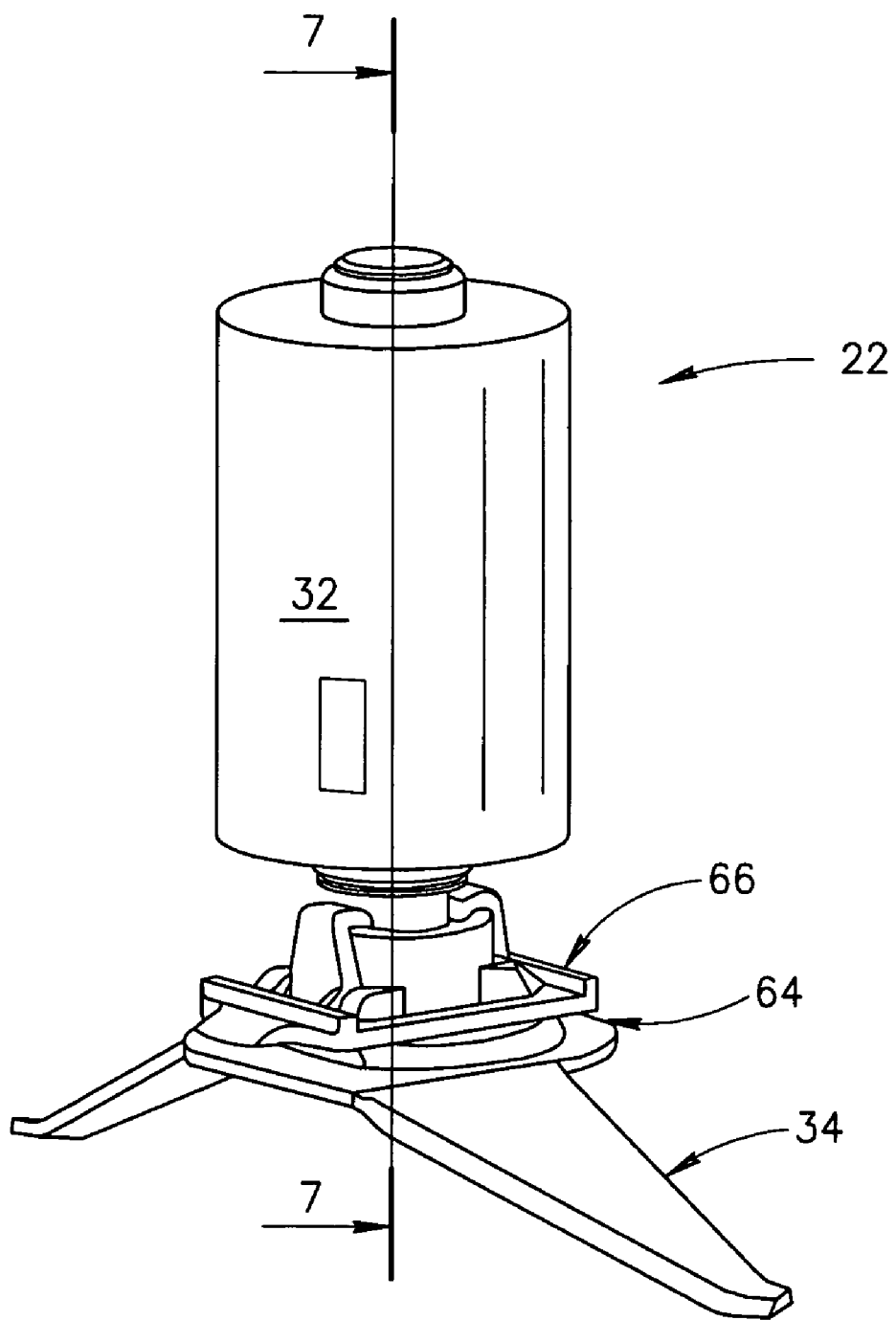
FIG. 4 is a perspective view of the first embodiment of the blade assembly.
Figure 5:
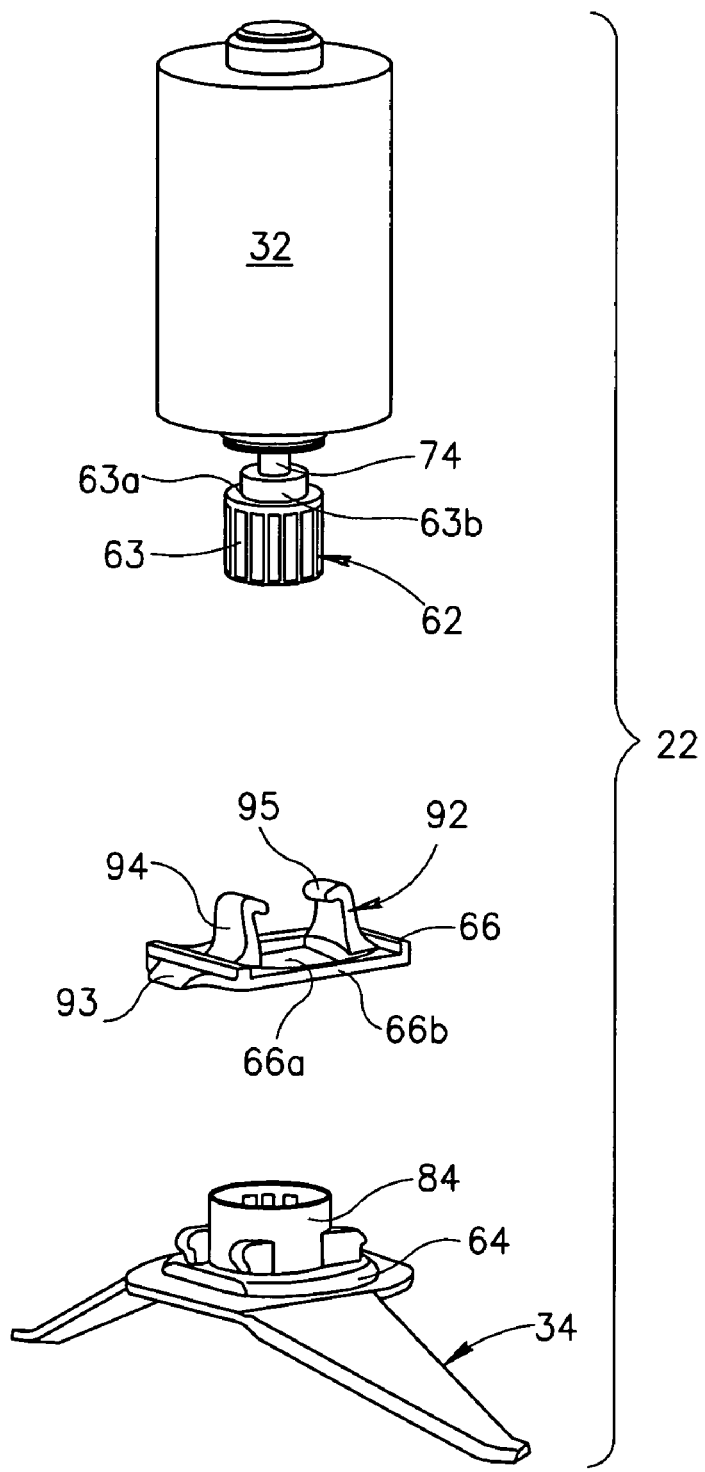
FIG. 5 is an exploded view of the first embodiment of the blade assembly.

FIGS. 4 and 5 show a first blade assembly 22, representative of the blade assemblies 22a-22c detailed above. The blade assembly 22 includes a motor 32, representative of motors 32a-32c detailed above, for rotating the blades 34. The motor 32 terminates in a stub 62, having a main portion 63 with a downwardly sloped rim 63a, and a neck portion 63b. The stub 62 is received by a receiving member 64 on the blade 34. The receiving member 64 engages a collar 66, having a central opening 66a, surrounded by a periphery 66b, that provides a temporary locking structure for the stub 62 in the receiving member 64, for safely securing the blade 34 for proper rotation and cutting.

Figure 6:
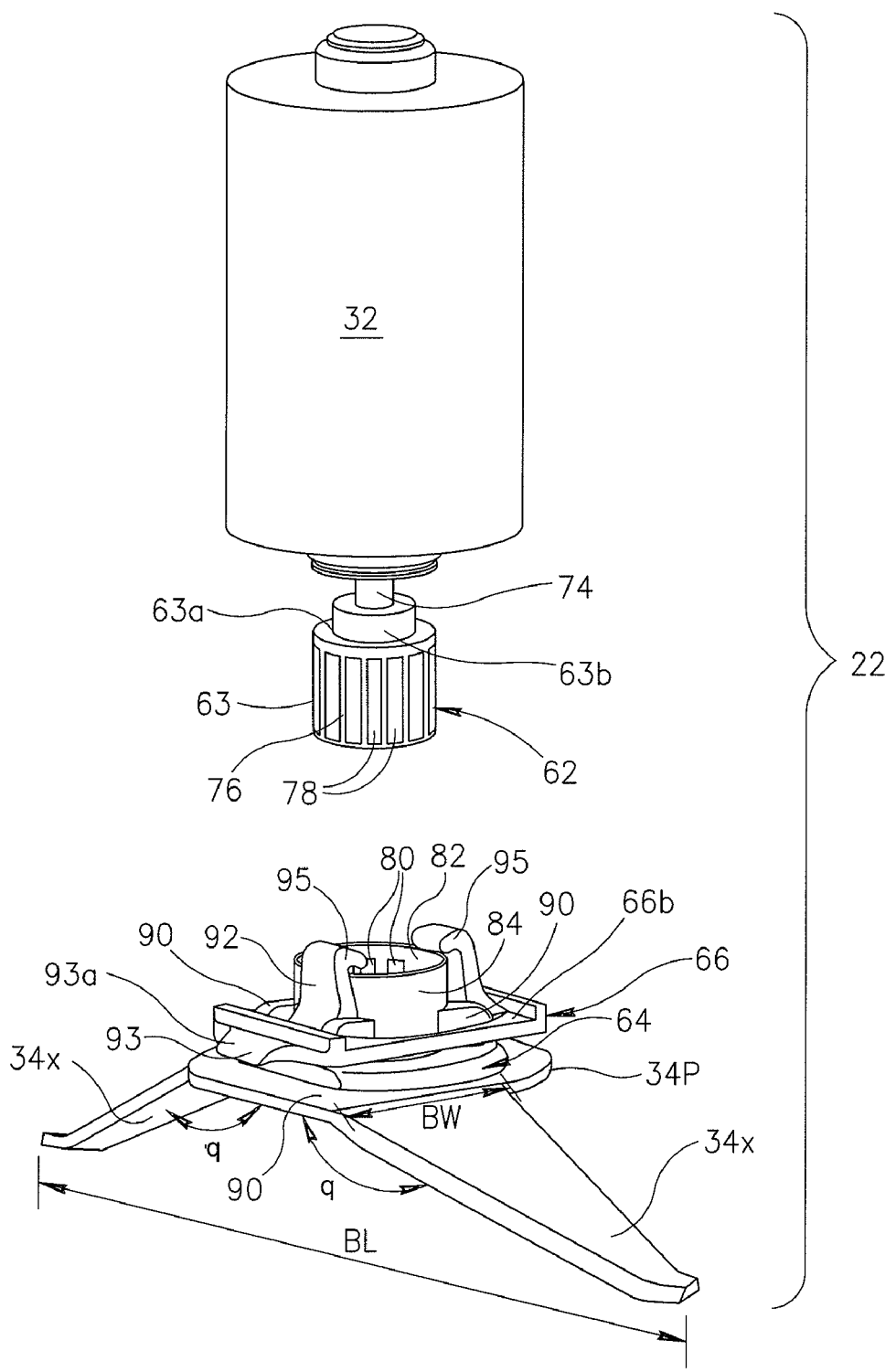
FIG. 6 is a partially exploded view of the first embodiment of the blade assembly.
Figure 7:
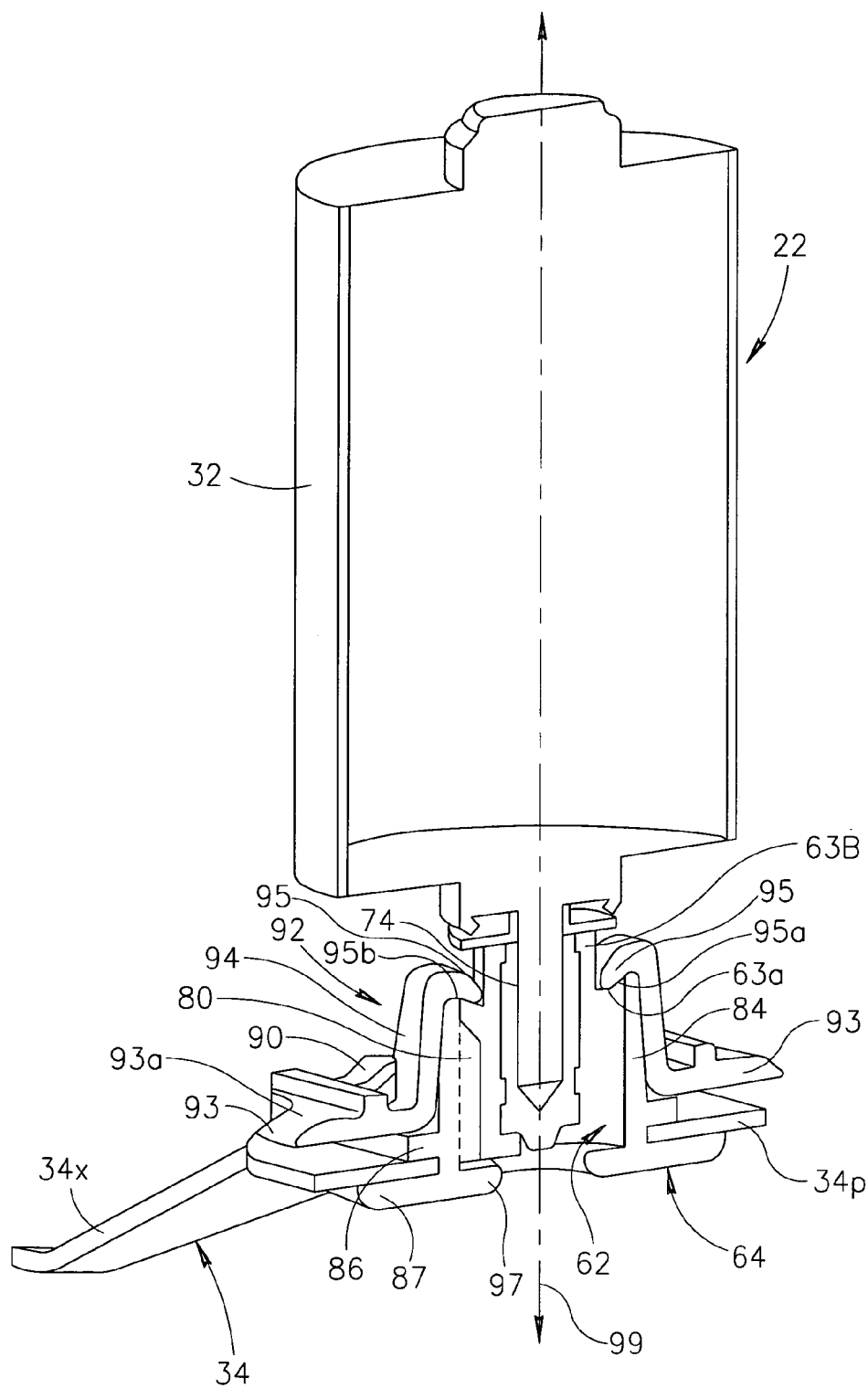
FIG. 7 is a cross-sectional view of the first embodiment of the blade assembly 2 taken along line 7-7 of FIG. 4.

Continuing also with FIGS. 6 and 7, the stub 62, at its, neck portion 63b, connects to a rotatable shaft 74, extending from the motor 32. The stub 62 has an outer surface 76 along its main portion 63 with a series of indentations 78. The stub 64 is typically made of a hard resilient polymeric material, such as Nylon 6, that can be impregnated with approximately 20-30 percent glass fibers, by techniques such as injection molding or the like, and is attached to the shaft 74 be heat bonding, adhesives, or the like.

These indentations 78 are spaced apart with respect to each other so as to be engaged by protrusions 80 on the receiving member 64, along the inner surface 82 of the stub receiving portion 84. These protrusions 80 are correspondingly shaped and spaced apart from each other with respect to the indentations 78, such that when the stub 62 is in the receiving portion 84, the indentations 78 and protrusions 80 create a frictional engagement that is frictionally snug, yet allows for some rotational "play". By allowing this slight amount of rotational "play", the blade attachment is not too tight, whereby the blade could fail upon rotation and/or cutting.

It is preferred that the stub 62 and receiving portion 84 be circular in shape, and cylindrical, with other shapes also permissible. Alternately, the positioning of the indentations 78 and protrusions 80 could be switched between the stub 62 and the receiving portion 84.

The receiving member 64 attaches to the blade 34 at a central platform 34p, as toroidal flanges 86, 87 engage the edges of the opening 88 of the central platform 34p in a frictionally tight manner, with minimal, if any "play" therebetween. Accordingly, since tight connections, with minimal if any "play", are necessary for the stub 66 to the shaft 74 and the receiving member 64 to the central platform 34p, the receiving member 84 is typically made of a hard resilient polymeric material, such as Nylon 6, that can be impregnated with approximately 20-30 percent glass fibers, as above. The receiving member 64 is typically formed by being molded onto the respective blade 34.

The receiving member 64 also includes a plurality of shoulder members 90 on the upper flange 86, that due to the resiliency of the material from which the receiving member 64 is made, are slightly flexible. These shoulder members 90 move inward when the collar 66 is placed thereover, and spring back to engage the periphery 66b of the collar 66 in a locking manner, once the collar 66 is in abutment with the upper flange 86. The collar opening 66a is dimensioned such that the upon the locking engagement, there is minimal, if any, rotational "play" between the receiving member 64 and the collar 66.

The collar 66 includes oppositely disposed Z-shaped members 92, each formed of a tapered end 93, a main body 94 and a hooked end 95. The material that forms the collar 66, is of greater flexibility than the material of the receiving member 64, and is sufficiently flexible to allow these Z-shaped members 92 to have spring-like behavior. One suitable material for this collar is acetyl, molded as a single piece by conventional plastic molding techniques.

The tapered ends 93 are such that when gripped by a user and pressed inward, the hooked ends 95 spread apart and move outward a sufficient distance, where the stub 62 can be removed from the receiving member 64, resulting in the disengagement and disassembly of the blade assembly 22, as detailed below. The tapered ends 93 typically include serrations 93a, that create additional friction when gripped by a user.

Each hooked end 95 extends inward and downward, and has a lower surface 95a, shaped to correspond to the rim 63a of the stub 62, and an upper surface 95b that is tapered such that contact with the stub 62 (as it is pushed into the receiving portion 84) spreads the hooked ends 95 apart, allowing the stub 62 to pass into the receiving portion 84.

Once the entire stub 62 seats in the receiving portion 84, as it abuts the inner flange 97 of the receiving member 64, the Z-shaped members 92, spring inward, and the hooked ends 95 extend beyond both the stub 62 and receiving portion 84, with lower surfaces 95a of the hooked ends 95 abutting the rim 63a of the stub 62, locking the stub 62 in place. The stub 62, receiving portion 84 and Z-shaped members 92, are correspondingly dimensioned to form a frictionally tight engagement, such that axial (up and down) play is minimal if any, with rotational "play" in accordance with that described above. This engagement is such that the stub 62 will remain locked in the receiving member 62, until disengagement for disassembly of the blade 34 from the motor 32 is desired by the user (detailed below).

The blade 34 is of a standard construction, of materials such as steel, for example, Boron Steel, Stainless steel or the like. For example, the blades 34 could be dimensioned such that they are of a length (BL) that is approximately 19 cm, and of a maximum width (BW) that is approximately 3.5 cm. For example, the actual cutting portions 34x extend laterally from the platform 34p, at an angle "q", that can be approximately 60 degrees. The blades 34 can also be shaped in accordance with those detailed in PCT patent application No. PCT/IL99/00336 (WO 99/65289).

The blade 34 collar 66, and stub 70, shaft 72 and motor 32 are symmetric in construction and are configured to align, engage and be retained coaxially, along the axis 99. As a result of this structure and coaxial alignment, engagement, and retention, the blade assembly is balanced, for proper rotation and cutting.

In exemplary engagement and disengagement operations, the blade 34 can be separated from the motor 32 in a tool free manner by a single user, using just his two hands. By tool free, it is meant that tools, ordinary and/or custom, are not required for the exemplary engagement or disengagement operations.

Initially, the user typically receives the blade assembly 22 in two pieces, as shown in FIG. 6. These pieces are the motor 32, with its shaft 74 and stub 62 as one piece, and the blade 34 and collar 66 as a single member, as the other piece.

When, assembly or engagement is desired, body 24 is held by a first hand of a user and the blade 34 (with the collar 66 attached, as shown in FIG. 6) is held by the other hand. The stub 62 is pressed into contact with the receiving portion 84 of the receiving member 64 on the blade 34. Upon this pressure, the stub 62 forces the hooked ends 95 of the Z-shaped members 92 to move outward, apart from each other. The stub 62 is pushed into the receiving portion 84, and seats therein, whereby the protrusions 80 on the inner surface 82 of the receiving portion 84 engage the corresponding indentations 78 on the stub 62. Seating is complete when the stub 62 abuts the inner flange 97 of the receiving member 64. This seating is such that the rim 63a of the stub 62 has now passed the hooked ends 95 of the Z-shaped members 92, whereby the Z-shaped members springs inward to a pint where the hooked ends 95 extend beyond the receiving portion 84 and the rim 63a of the stub 62, and make a frictional contact therewith. The resultant engagement locks the stub 62 in the receiving member 64, such that the motor 32 and blade 34 are connected, and the blade assembly 22 is assembled.

When disassembly or disengagement of the motor 32 and blade 34 is desired, a first hand holds the body 24, while a second hand holds the blade 34. The tapered ends 93 of the Z-shaped members 92 are pressed downward (away from the robot 20) whereby the hooked ends 95 move outward and spread apart. The stub 62 is now free to move axially and the hand grasping the blade 34 then pulls the blade 34 away from the motor 32, with force suitable to overcome the forces of the hooked ends 95 of the Z-shaped member 92. Pulling continues until the stub 62 has cleared the receiving portion 84, and the blade 34 is completely separate from the motor 32, and thus disengaged, whereby the blade assembly is disassembled.

Figure 8:
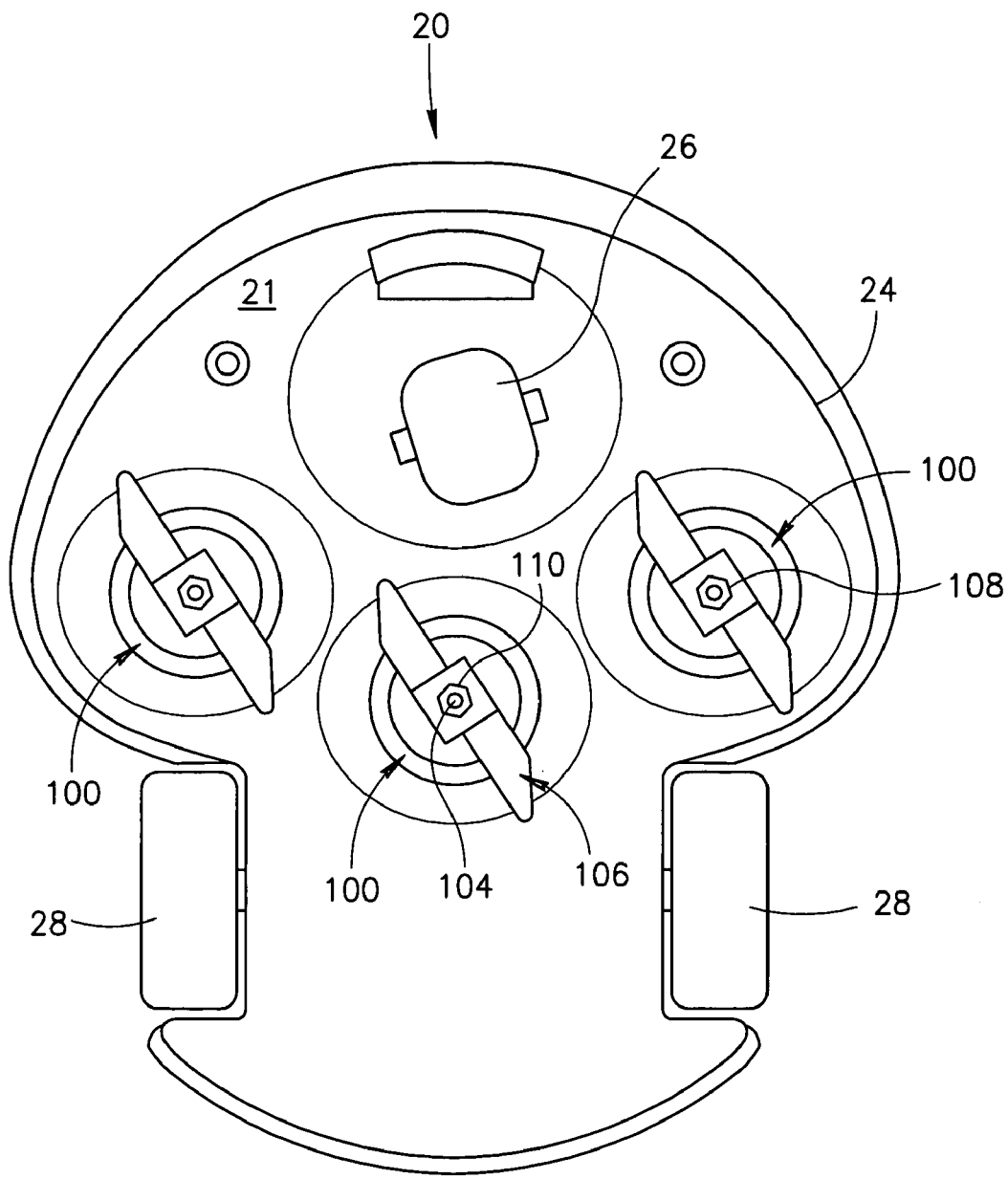
FIG. 8 is the present invention with a second embodiment of the blade assembly.

FIG. 8 details a second embodiment of the blade assembly 100, as shown on the cutting deck 21 shown in FIG. 2 and detailed above, and suitable for us with the robotic mower 20 (detailed above). In this blade assembly 100, the motor (not shown), shaft 104, and blade 106 are similar to the motor 32, shaft 72 and blade 34 detailed above, except where noted. The blade 106 includes at least a central opening 108. The shaft 104 is modified, such that at least a portion of it can receive the central opening 108 of the blade 106, and is typically threaded at its end, as to accommodate a bolts 110 and other mechanical fastening hardware.

Example

A robotic lawnmower was constructed in accordance with FIG. 7 of the present invention, having 7.5 inch (19.05 cm) blades in each of its three blade assemblies. The motors employed with each of the blade assemblies were 150 W input motors. A robotic lawnmower was constructed in accordance with PCT/IL99/00336, incorporated by reference herein, with a single 18 inch (45.72 cm) blade, driven, by a 450 W input motor. Both robotic mowers were run for a period of 100 minutes, with their blades rotating at typical grass cutting (lawn mowing) speeds of 6000 cm/sec. The input power for running all three 150 W input motors of the three-bladed robot of the present invention was, on average, less than the input power required for running the 450 W input motor single bladed robot.

In other embodiments, the blade assemblies 22, 100 detailed above could be modified for other applications. These modifications may include replacing the blades 34, 106 with sweeping mechanisms for floors, walkways, snow removal, etc.; polishing mechanisms for floors or the like; mopping mechanisms, for wet floor cleaning; and vacuums for indoor and outdoor use.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A lawnmower blade assembly comprising:
   a shaft configured to be in rotatable communication with a motor;
   a stub in communication with said shaft;
   a blade; and,
   a receiver coupled to said blade, said receiver including a receiving portion and at least a plurality of flexible members configured for moving between inward and outward positions for engaging and retaining said stub in said receiving portion in a releasable engagement, said flexible members including first ends and second ends, said first ends including engaging portions for moving between said inward and outward positions, and said first ends in communication with said second ends, said first ends disposed opposite said second ends on said flexible members, and said second ends configured such that force on each of said second ends moves said engaging portions to said outward positions, allowing for at least the disengagement of said blade from said stub.

2. The blade assembly of claim 1, wherein said shaft, stub, blade and receiver are configured to be in coaxial alignment, such that said blade is balanced upon rotation.

3. The blade assembly of claim 2, wherein said stub includes an outer surface and said receiving portion includes an inner surface, said outer and said inner surfaces correspondingly configured with respect to each other for allowing a sufficient but minimal amount of rotational play for said blade.

4. A lawnmower blade comprising:
   a blade body, said blade body including oppositely disposed cutting portions and a platform intermediate said oppositely disposed cutting portions; and,
   a receiver, said receiver coupled to said platform in a substantially coaxial alignment, said receiver including flexible members for moving between inward and outward positions for retaining at least a portion of a rotatable member in communication with a motor in a releasable engagement at least partially within said receiver, said flexible members including first portions configured for moving between said inward and outward positions, and second portions, in communication with said first portions, said first portions and said second portions disposed at opposite ends of said flexible members, said second portions configured such that pressure on said second portions moves said first portions to said outward positions, and, said receiver is configured for receiving and retaining said at least a portion of said rotatable member in a substantially coaxial alignment therewith, such that said blade body is balanced upon rotation.

5. The lawnmower blade of claim 4, wherein said first portions of said flexible members include bodies configured for spring-like behavior.

6. The lawnmower blade of claim 4, wherein said receiver includes a receiving portion for receiving said at least a portion of said rotatable member.

7. The lawnmower blade of claim 6, wherein said receiving portion includes an inner surface that is configured to receive said at least a portion of said rotatable member in a manner to allow a sufficient but minimal amount of rotational play for said lawnmower blade.

8. A lawnmower blade comprising:
a blade body, said blade body including oppositely disposed cutting portions and a platform intermediate said oppositely disposed cutting portions; and,
a receiver, said receiver coupled to said platform in a substantially coaxial alignment, said receiver including a receiving portion for receiving at least a portion of a rotatable member in a substantially coaxial alignment therewith, such that said blade body is balanced upon rotation, and flexible members for moving between inward and outward positions, for retaining said at least a portion of said rotatable member in a releasable engagement at least partially within said receiving portion, said flexible members including first portions configured for moving between said inward and outward positions, and second portions, said second portions in communication with said first portions, said first portions and said second portions disposed at opposite ends of said flexible members, and, for each of said flexible members, said second portion is configured such that pressure on said second portion moves said first portion to said outward position.

9. The lawnmower blade of claim 8, wherein said first portions of said flexible members include bodies configured for spring-like behavior.

10. The lawnmower blade of claim 9, wherein said receiving portion includes an inner surface that is configured to receive said at least a portion of said rotatable member in a manner to allow a sufficient but minimal amount of rotational play for said lawnmower blade.

11. A lawnmower blade comprising:
a blade body, said blade body including oppositely disposed cutting portions and a platform intermediate said oppositely disposed cutting portions;
a receiver, said receiver coupled to said platform in a substantially coaxial alignment, said receiver including at least two flexible members, each of said flexible members configured for moving between inward and outward positions for retaining at least a portion of a rotatable member in communication with a motor in a releasable engagement at least partially within said receiver, each of said flexible members including oppositely disposed first and second ends, said first ends including first portions configured for moving between said inward and outward positions, and said second ends including second portions, said second portions separate from and in communication with said first portions, said second portions configured such that pressure on said second portions moves said first portions to said outward positions; and,
said receiver is configured for receiving and retaining said at least a portion of said rotatable member in a substantially coaxial alignment therewith, such that said blade body is balanced upon rotation.

12. The lawnmower blade of claim 11, wherein said first portions of said flexible members include bodies configured for spring-like behavior.

13. The lawnmower blade of claim 11, wherein said receiver includes a receiving portion for receiving said at least a portion of said rotatable member.

14. The lawnmower blade of claim 13, wherein said receiving portion includes an inner surface that is configured to receive said at least a portion of said rotatable member in a manner to allow a sufficient but minimal amount of rotational play for said lawnmower blade.

15. A lawnmower blade comprising:
a blade body, said blade body including oppositely disposed cutting portions and a platform intermediate said oppositely disposed cutting portions; and,
a receiver, said receiver coupled to said platform in a substantially coaxial alignment, said receiver comprising:
a receiving portion for receiving at least a portion of a rotatable member, said receiving portion including an inner surface including a plurality of protrusions spaced apart to define a series of ridges and grooves for receiving said at least a portion of said rotatable member having a correspondingly configured outer surface, and, said receiving portion is configured for receiving and retaining said at least a portion of said rotatable member in a substantially coaxial alignment therewith, such that said blade body is balanced upon rotation; and,
a plurality of flexible members for moving between inward and outward positions, for retaining said at least a portion of said rotatable member in a releasable engagement at least partially within said receiving portion, said flexible members including first portions configured for moving between said inward and outward positions, and second portions, said second portions in communication with said first portions, said first portions and said second portions disposed at opposite ends of said flexible members, and, for each of said flexible members, said second portion is configured such that pressure on said second portion moves said first portion to said outward position.

16. The lawnmower blade of claim 15, wherein said first portions of said flexible members include bodies configured for spring-like behavior.

17. The lawnmower blade of claim 16, wherein said plurality of protrusions of the receiving portion are configured to receive said rotatable member along a correspondingly configured outer surface in a manner to such that retaining forces of said flexible members on said at least a portion of said rotatable member are greater than rotational forces on said lawnmower blade.

\* \* \* \* \*

UNITED STATES PATENT AND TRADEMARK OFFICE
CERTIFICATE OF CORRECTION

| | | |
|---|---|---|
| PATENT NO. | : 8,136,333 B1 | Page 1 of 1 |
| APPLICATION NO. | : 09/531735 | |
| DATED | : March 20, 2012 | |
| INVENTOR(S) | : Shalom Levin and Shai Abramson | |

It is certified that error appears in the above-identified patent and that said Letters Patent is hereby corrected as shown below:

ON THE TITLE PAGE:

Item (74) is to read:

(74) Attorney, Agent, or Firm- Gerry J. Elman; Elman Technology Law, P.C.

Signed and Sealed this

Nineteenth Day of June, 2012

David J. Kappos
*Director of the United States Patent and Trademark Office*